(12) United States Patent
Meerbeek et al.

(10) Patent No.: US 9,668,312 B2
(45) Date of Patent: May 30, 2017

(54) LIGHTING SYSTEM AND A METHOD OF CONTROLLING A LIGHTING SYSTEM

(71) Applicant: PHILIPS LIGHTING HOLDING B.V., Eindhoven (NL)

(72) Inventors: Berent Willem Meerbeek, Eindhoven (NL); Jochen Renaat Van Gheluwe, Eindhoven (NL); Jacobus Dingenis Machiel Van Boven, Eindhoven (NL); Petrus Johannes Hendrikus Seuntiens, Eindhoven (NL); Evert Jan Van Loenen, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

(21) Appl. No.: 15/026,480

(22) PCT Filed: Sep. 25, 2014

(86) PCT No.: PCT/EP2014/070432
§ 371 (c)(1),
(2) Date: Mar. 31, 2016

(87) PCT Pub. No.: WO2015/049146
PCT Pub. Date: Apr. 9, 2015

(65) Prior Publication Data
US 2016/0227618 A1    Aug. 4, 2016

(30) Foreign Application Priority Data
Oct. 2, 2013 (EP) .................................... 13187108

(51) Int. Cl.
*H05B 33/08*      (2006.01)
*H05B 37/02*      (2006.01)
(Continued)

(52) U.S. Cl.
CPC ......... *H05B 33/0854* (2013.01); *F21V 5/045* (2013.01); *F21V 7/0091* (2013.01);
(Continued)

(58) Field of Classification Search
CPC .. H05B 37/02; H05B 37/029; H05B 37/0272; H05B 37/0218; H05B 33/0818;
(Continued)

(56) References Cited

U.S. PATENT DOCUMENTS 7,180,252 B2 * 2/2007 Lys .................... H05B 33/0803
                                                    315/291
7,314,289 B2 * 1/2008 Montagne ............... F21S 10/02
                                                    362/231
(Continued)

FOREIGN PATENT DOCUMENTS

CN         102160914 A     8/2011
DE     202011051548 U1     2/2013
(Continued)

OTHER PUBLICATIONS

B.Bollen, Master Thesis: "Dynamic Artificial Daylight Simulation", Koninklijke Philips N.V., Delft University of Technology, Eindhoven, The Netherlands, Jul. 25, 2012, pp. 1-113.
(Continued)

*Primary Examiner* — Haissa Philogene (57) ABSTRACT

A lighting system uses an array of lighting elements which provide light in different directions. The intensity of the lighting elements is controlled in dependence on a time-varying parameter related to at least one of a position of a light emitting or light reflecting body, and an intensity, color or color temperature of the light emitted or reflected by the body, such that the system can simulate directional sunlight.

13 Claims, 5 Drawing Sheets

(51) Int. Cl.
*F21V 5/04* (2006.01)
*F21V 7/00* (2006.01)
*F21V 14/06* (2006.01)

(52) U.S. Cl.
CPC ......... *F21V 14/06* (2013.01); *H05B 33/0803* (2013.01); *H05B 33/0866* (2013.01); *H05B 33/0872* (2013.01); *H05B 37/029* (2013.01); *H05B 37/0218* (2013.01); *H05B 37/0281* (2013.01); *Y02B 20/42* (2013.01)

(58) Field of Classification Search
CPC ............ H05B 33/0845; H05B 33/0857; H05B 33/0869; H05B 33/0872; H05B 33/0854; H05B 33/0803; F21Y 2101/02; B60Q 1/18; F21V 5/045; F21V 7/0091; F21V 14/06
USPC ....... 315/149, 159, 294, 297, 307, 312, 360; 362/227, 231, 464, 543, 545
See application file for complete search history.

(56) References Cited

U.S. PATENT DOCUMENTS 7,344,279 B2 * 3/2008 Mueller ................ F21S 48/325
362/240

| | | |
|---|---|---|
| 2002/0196639 A1 | 12/2002 | Weidel |
| 2007/0132892 A1 | 6/2007 | Nishigaki et al. |
| 2014/0292206 A1 * | 10/2014 | Lashina ................ H05B 37/02 315/149 |
| 2016/0234911 A1 * | 8/2016 | Schlangen ........... H05B 37/029 |

FOREIGN PATENT DOCUMENTS

| | | |
|---|---|---|
| EP | 1270324 A2 | 1/2003 |
| JP | 2012221838 A | 11/2012 |
| TW | 201011943 A | 3/2010 |
| WO | WO2004049765 A1 | 6/2004 |
| WO | WO2008002073 A1 | 1/2008 |
| WO | WO2011089553 A1 | 7/2011 |
| WO | WO2012140579 A | 10/2012 |
| WO | WO2013011404 A | 1/2013 |
| WO | WO2013011410 A | 1/2013 |
| WO | WO2013011481 A | 1/2013 |
| WO | WO2013061189 A1 | 5/2013 |

OTHER PUBLICATIONS

M. Bues, et al., "Mediendienst", Fraunhofer-Instit fur Arbeitswirtschaft und Organisation IAO—Fraunhofer Presse, Jan. 31, 2012, pp. 1-4, XP002721467.

* cited by examiner

LIGHTING SYSTEM AND A METHOD OF CONTROLLING A LIGHTING SYSTEM

CROSS-REFERENCE TO PRIOR APPLICATIONS

This application is the U.S. National Phase application under 35 U.S.C. §371 of International Application No. PCT/EP2014/070432, filed on Sep. 25, 2014, which claims the benefit of European Patent Application No. 13187108.9, filed on Oct. 2, 2013. These applications are hereby incorporated by reference herein.

FIELD OF THE INVENTION

This invention relates to interior lighting systems.

BACKGROUND OF THE INVENTION

People generally prefer daylight over artificial light as their primary source of illumination. Everybody recognizes the importance of daylight in our daily lives. Daylight is known to be important for people's health and well-being.

In general, people spend over 90% of their time indoors, and often away from natural daylight. There is therefore a need for artificial daylight sources that create convincing daylight impressions with artificial light, in environments that lack natural daylight including homes, schools, shops, offices, hospital rooms, and bathrooms.

Artificial daylight sources on the market focus mainly on high intensity, tunable color temperature, and slow dynamics (day/night rhythms). It is also known to create a sky view in a ceiling using a display or foil.

There has been significant development of lighting systems which try to emulate daylight even more faithfully.

Current technology used to create daylight effects are often based on fluorescent solutions with a strong diffuser on top. It is possible to create tunable intensity and tunable color temperature solutions using this approach. However, many of these solutions do not provide a realistic daylight experience because there is hardly any direct light to provide sharp shadows. Indeed, one particular feature of natural daylight which has not been well emulated is the relation between diffuse and direct light. Direct light provides sharp shadows whereas diffuse light is less intense. An impression of natural daylight is much stronger when direct light and diffuse light components are combined.

There is therefore a need for a system which provides more realistic representations of daylight, or the passage of the moon or stars across a night sky.

SUMMARY OF THE INVENTION

The invention is defined by the claims.

According to the invention, there is provided a lighting system comprising:
a lighting unit having an array of lighting elements arranged to emit light through a light exit aperture of the lighting unit, wherein different lighting elements are arranged to provide light in different directions through the light exit aperture; and
a controller,
wherein the controller is adapted to control the lighting elements in dependence on a time-varying parameter related to at least one of a position of a light emitting or light reflecting body, and an intensity, color or color temperature of the light emitted or reflected by the body, such that a first lighting element which provides light in a direction corresponding to position of the light emitting or light reflecting body is brighter than a second lighting element providing light in a direction offset from the direction corresponding to the position of the light emitting or light reflecting body.

This lighting system increases the light intensity projected in a particular direction, in a time-varying manner, in order to simulate sunlight. This is achieved by providing an array of lighting elements. Over time, the brighter intensity can move across the array, to simulate a moving sun. The brighter intensity lighting elements provide shadows and directional lighting, whereas the lower intensity lighting elements can provide more diffuse general lighting, for example to simulate the scattered light from the sky.

As a minimum, the array can comprise a one dimensional array, i.e. a line of light sources. Alternatively a 2D arrays of light sources is provided over a flat or a curved surface.

The brighter intensity lighting elements preferably also have different light emission spectrum (i.e. color) so that non-directional sky color can be combined with directional sun color.

Thus, preferably the first lighting element has a light emission spectrum which is different to the light emission spectrum of the second lighting element.

In this way, the invention provides an artificial daylight system, for example which can be formed as a luminaire, and which can be controlled to implement time-dependent daylight effects.

Over time, sky conditions vary. Different sky conditions also produce different levels of direct and diffuse daylight. An overcast sky mostly emits diffuse light, whilst partly cloudy and clear sky conditions produce directional light. The invention enables not only the level of directionality of the light to be controllable but also the balance between the higher intensity directional lighting and the lower intensity background lighting, for the creation of a realistic daylight experience. This balance can also evolve over time to reflect changing weather conditions. Indeed, a common reaction of people when they experience existing artificial daylight solutions is that the lighting should change over time to better reflect the real daylight conditions or simulate sunrises and sunsets. Furthermore, a more directional element in the light effect that indicates the position of the sun is desirable.

The lighting system can be controlled in different ways. As a minimum, the system is able to vary the perceived direction of the light output to simulate the position (or a virtual position) of a light emitting or light reflecting body, which can represent the sun, moon or stars. However, the system can be controlled in other ways, for example:
to create the perception that the light comes from all angles, or
to mimic light from different sky conditions (for example a cloudy day or a day with clear sky), or
to adapt intensity and color temperature of the light output.

As outlined above, as a minimum the system can control light direction over time. Thus, the parameter preferably takes into account the time of day. This time of day value can be detected or it can be input by a user. For example the lighting system can evolve during the day automatically, but it is also possible for a user to set the system to a specific static setting, such as a midday appearance.

The parameter can take into account the time of day value and the time within the year. In this way, the indoor lighting can be made to simulate the outdoor lighting, at least during the hours when the outdoor lighting level is sufficient. Of course, when it is dark outside, the interior lighting no longer needs to replicate the outdoor lighting, but can be controlled differently to provide the type of lighting desired by the user for night time illumination or it can be controlled to represent the passage of the moon or stars across a night sky.

The parameter can also take into account the geographical location of the system, again so that the sun position can be replicated. Thus, as a minimum, the system implements time-dependent control of the light sources, but additionally the control can be location dependent.

The parameter can also take into account the weather conditions at the location of the system, so that the outdoor lighting can replicated even taking into account cloud cover etc. The weather condition can be another time-dependent control parameter.

Different lighting elements can have light outputs with different color points, such that lighting elements having a directly downward light output direction through the exit aperture have a higher color temperature than lighting elements with a light output direction offset from the downward direction. In this way, the lighting color point can evolve during the course of a day to match the corresponding change in color point of natural daylight.

The array of lighting elements preferably comprises a matrix of LEDs. LEDs have the advantage of having easily controlled intensity. Furthermore, by using color LED clusters, the color point can be controlled electrically, so that all LED clusters can be the same, whilst still enabling different color points to be enabled for different lighting direction.

A diffuser can be provided at the light exit aperture. This can prevent the individual lighting elements being visible.

In one example, the array of lighting elements comprises a matrix of lighting elements provided on a convex curved support facing the light output aperture. The curvature of the support then provides the directional control. However, this requires a thick lighting fixture.

An alternative therefore is to provide the array of lighting elements as a matrix of lighting elements provided on a planar support, wherein each lighting element comprises a light source and an arrangement for setting the light output direction.

This enables a thinner unit. The arrangement for setting the direction can comprise:

a support surface for each lighting element, with different support surfaces tilted at different angles, and a light collimator associated with each lighting element; or a beam shaping optical arrangement associated with each lighting element with different beam shaping elements providing different directional output; or a beam shaping optical arrangement associated with each lighting element with different relative positions of identical beam shaping elements with respect to their associated lighting elements providing different directional output; or a collimator associated with each lighting element and a shared Fresnel lens providing different directional output.

The system can further comprise a second array of lighting elements each arranged to emit light in the same range of output directions through the light exit aperture. This second array can be used to provide uniform lighting, such as to simulate general scattered lighting from the sky. The lighting elements of the second array can have a color point with a greater blue component than the color point of the lighting elements of the first array, so that different lighting element types are used to represent the sky and the sun. As mentioned above, with color controllable lighting elements, the same effect can instead be achieved with the same type of lighting elements. The lighting elements of the second array only can for example have controllable color point so that different general illumination colors can be selected.

The invention also provides a method of controlling a lighting system, comprising:

detecting a time-varying parameter or receiving an input of a time varying parameter;

deriving a position of a light emitting or light reflecting body from the time-varying parameter; and controlling a lighting unit to emit light through a light exit aperture of the lighting unit, with different lighting elements providing light in different directions through the light exit aperture, wherein the method further comprises controlling the intensity of the lighting elements in dependence on the position of the light emitting or light reflecting body, such that a first lighting element which provides light in a direction corresponding to the direction from the position of the light emitting or light reflecting body is brighter than a second lighting element providing light in a direction offset from the direction corresponding to the direction from the position of the light emitting or light reflecting body.

The time varying parameter preferably includes the time of day, and it optionally can also include the time year (i.e. the date). The controller can also take into account the geographical location of the system.

The method can comprise controlling the first lighting unit to have the brightest intensity and controlling other lighting units with reduced intensity in dependence on their distance from the first lighting unit. By applying a minimum light intensity to all of the lighting units, a general level of illumination can be ensured.

BRIEF DESCRIPTION OF THE DRAWINGS

Examples of the invention will now be described in detail with reference to the accompanying drawings, in which.

DETAILED DESCRIPTION OF THE EMBODIMENTS

The invention provides a lighting system which uses an array of lighting elements which provide light in different directions. The intensity of the lighting elements is controlled in dependence on a time-varying parameter which relates to at least one of a position of a light emitting or light reflecting body, and an intensity, color or color temperature of the light emitted or reflected by the body (which can simply be a position corresponding to a determined position of the sun), such that the system simulates directional sunlight.

Figure 1:
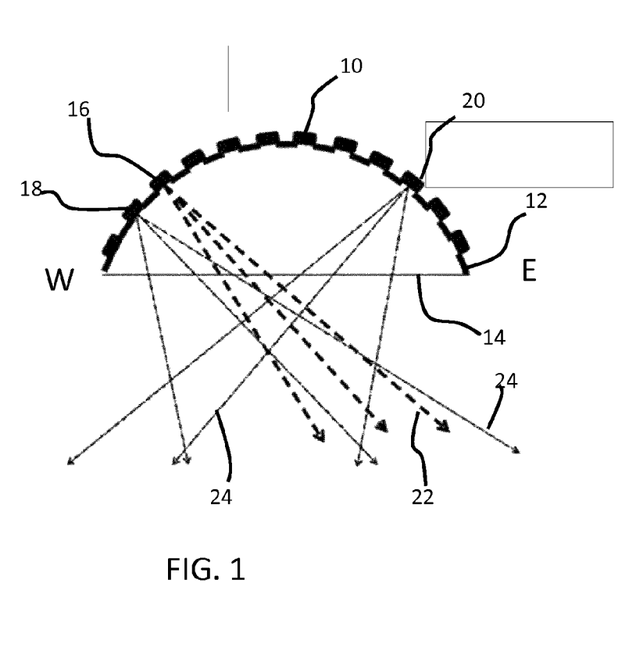
FIG. 1 shows a first example of a lighting unit for use in a system, and representing early evening daylight.

FIG. 1 shows a first example of lighting system representing early evening daylight. East and west are denoted by E and W. The system comprises an array of lighting elements 10 provided on a convex curved (e.g. spherical) support 12 facing a light output/exit aperture 14. The curvature of the support 12 means that different lighting elements provide light in different directions through the light exit aperture. Each lighting element can provide a partially collimated light output so that it provides a narrow directional output.

In a simplest version, the curvature is about one axis, so that the time variation can only track from one side to the other. This can use a one dimensional array (i.e. a line) of light sources. This may or may not match the sun tracking (depending on whether or not the unit is aligned East-West). Alternatively the curvature is about two axes, so that full control is possible, not only to select the East-West direction regardless of how the unit is mounted, but also to enable the season-dependent height of the sun in the sky to be simulated. In this case, the array is 2 dimensional if on a flat substrate, or 3 dimensional if on a curved substrate.

The intensity of the lighting elements is controlled in dependence on a parameter which in the preferred examples relates to a position of a light emitting or light reflecting body which may represent a virtual sun. In FIG. 1, the virtual sun position is a low West position representing a setting sun. A first lighting element 16 is controlled to provide light in a direction corresponding to the direction from the virtual sun position and it is brighter than the other lighting elements (i.e. brighter than at least one a second lighting element 18 or 20 providing light in a direction offset from the direction corresponding to the direction from the virtual sun position). In this way, the higher intensity light beams 22 represent the direct sunlight, whereas the other lower intensity light beams 24 represent the background scattered sky illumination.

Depending on the resolution of the array, there may of course be a sub-set of lighting elements at the brightest setting corresponding to the desired illumination direction.

Figure 2:
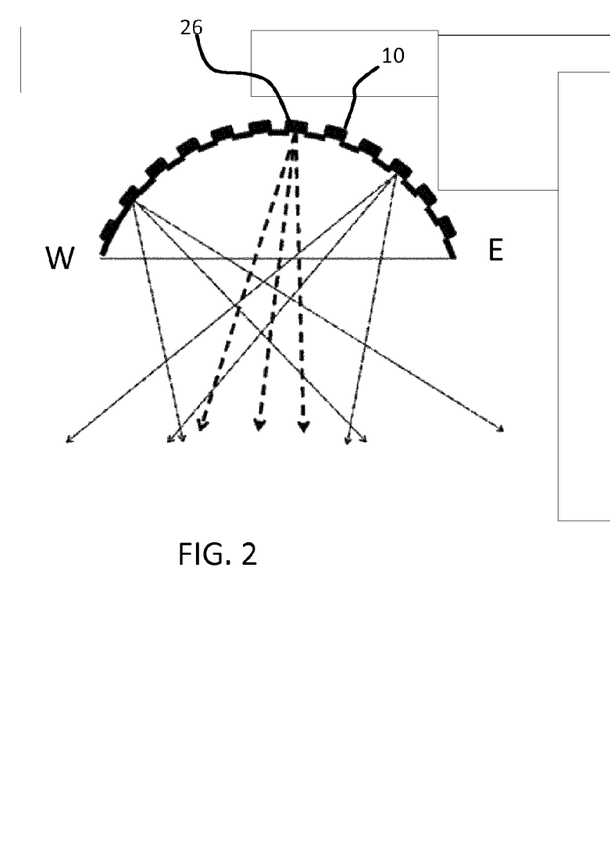
FIG. 2 shows the first example of a lighting unit representing near midday daylight.

FIG. 2 shows the same lighting system representing near midday daylight. In this case, the lighting element 26 provides the brightest intensity.

In this way, time-dependent daylight effects are obtained through the physical configurations of the light sources and their control.

The lighting elements can comprise LED modules. The LED modules can have different color temperatures and beam widths so that different effects can be generated. In this way, a wider beam width can be used for rising and setting sun positions (representing the greater scattering through the atmosphere) and also a reduced color temperature (e.g. an increased red content).

The directionality follows directly from the location on the curved support. LED modules near the center of the exit window are positioned perpendicular to the exit window. The further the LED module is from the center of the exit window, the larger the angle to the normal of the exit window at which the LED source is oriented.

Similarly, the typical color temperature levels of the LED modules close to the exit window can be higher than those of the off-center LED modules.

The lighting system can be controlled in various ways, including as a standard lighting unit with no time-varying control. However, the system includes at least a setting for operating a time-varying program to emulate natural daylight. For this purpose, a control method is used to adjust the intensity of LED modules.

First, a desired position of the 'virtual sun' is obtained. This can be implicitly based on the time (of day and optionally also time of year) and location on earth, or explicitly via user input.

A closest LED module (K) is found corresponding to the virtual sun position.

The intensity is set highest at this LED module (K).

From this center LED module K, the intensity of neighboring LEDs (K-1) is decreased with a certain percentage. This is repeated for the neighbors of the neighbors (K-2), etc. In this way, the further away from center K, the lower the intensity, for example following a Gaussian distribution.

Preferably, the LEDs most far away from K still have a minimum intensity, to prevent black spots and to provide a general overall level of illumination.

Figure 3:
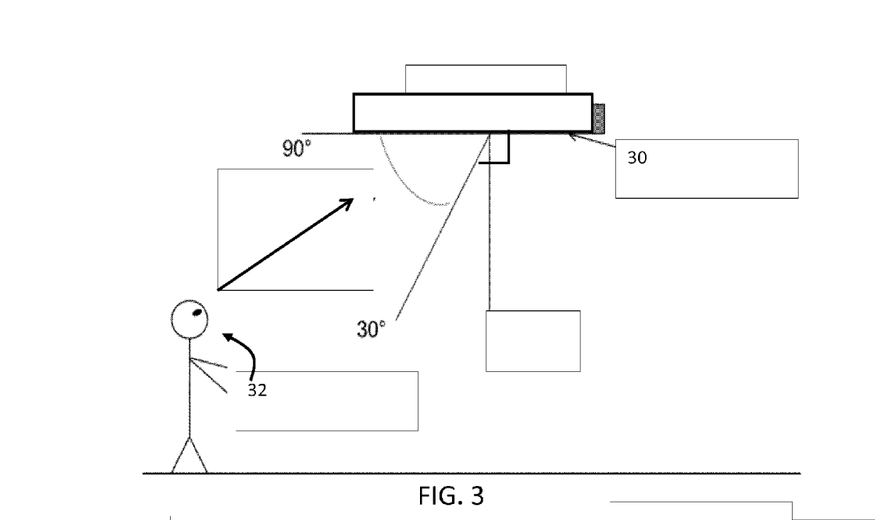
FIG. 3 shows generally a second example which enables the device to be formed in a relatively flat housing and is used also to show the benefit of a diffuser at the output.

FIG. 3 shows generally a second embodiment which enables the device to be formed in a relatively flat housing compared to the curved surface of FIGS. 1 and 2.

The system comprises a luminaire 30. Within the luminaire 30, there is an LED array providing the matrix of lighting elements, and also optics for beam shaping and/or collimation for controlling the direction of the light.

In preferred examples, there is a diffuser, for example between 0.5 and 30 degrees, at the exit window. This is used to hide the individual LEDs. As shown in FIG. 3, if an observer 32 looks at the exit window of the luminaire at an angle between 30 to 90 degrees from the normal of the luminaire exit window, they should not be able to see the individual LED modules. This angle range represents the typical line of sight of a person.

The optics within the luminaire function so that the different LEDs produce light beams under different angles in such a way that from an observers point of view, the effect is the same as if collimated light sources were placed on a curved surface as in the example of FIGS. 1 and 2. Again, the light beams near the center of the luminaire point downwards (parallel to the normal of the luminaire exit window), while the light beams originating from LEDs increasingly further away from the center are directed with increasingly larger deviation from the normal, in the direction of the center or the opposite edge of the device.

Figure 4:
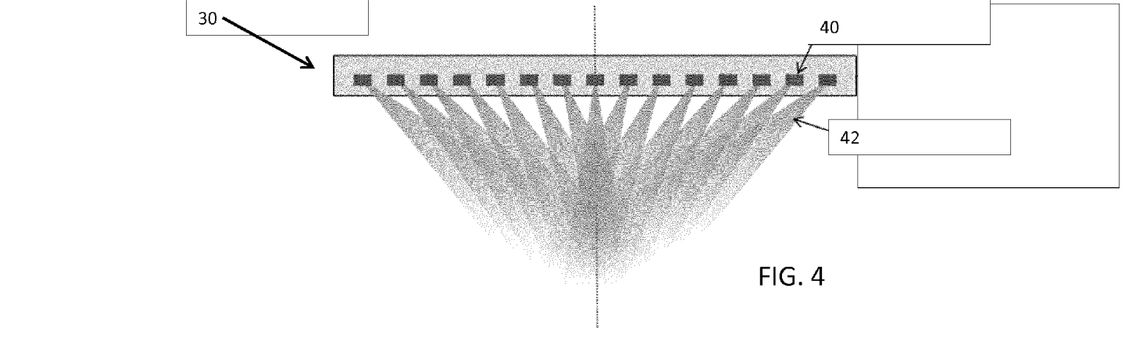
FIG. 4 shows the light output from the device of FIG. 3.

This is shown in FIG. 4, where the individual LEDs (or LED modules) 40 of the luminaire 30 are shown, each providing a directional output 42.

Figure 5:
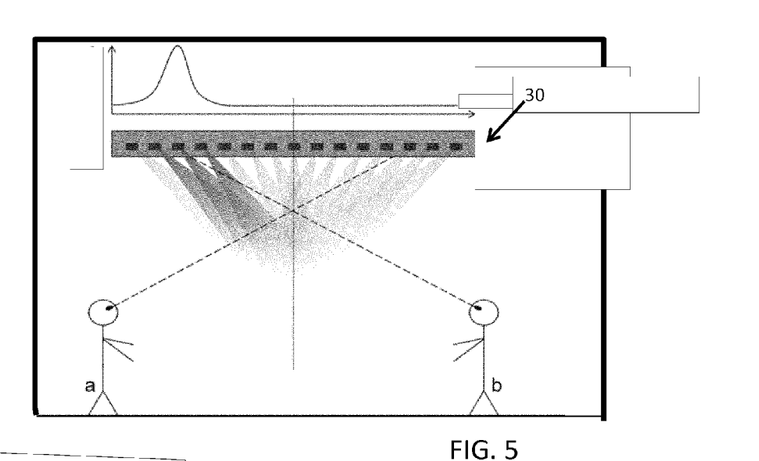
FIG. 5 shows how the lighting unit is controlled so that the light output appears differently, dependent on the position of the observer.

FIG. 5 shows some lighting elements used to provide a higher intensity output so that the direction of the light is controlled, and an observer has the impression of only seeing the light source under certain angles. The graph at the top shows the intensity as a function of position along the array of LEDs, and shows a Gaussian intensity distribution with a peak at the LED which corresponds to the virtual sun position.

When an observer "a" looks in the direction of the luminaire, he does not directly see this bright light source because the light is pointing away from him. He does however see the light in the room for example reflected on the floor or objects in the room. When observer "b" looks at the luminaire he sees a bright area in the exit window of the luminaire. The described effect is the same as the observer would experience looking at a skylight on a sunny day from a direction where the sun is visible in the skylight (observer "b") or from a direction where the sun is not visible in the skylight (observer "a").

Figure 6:
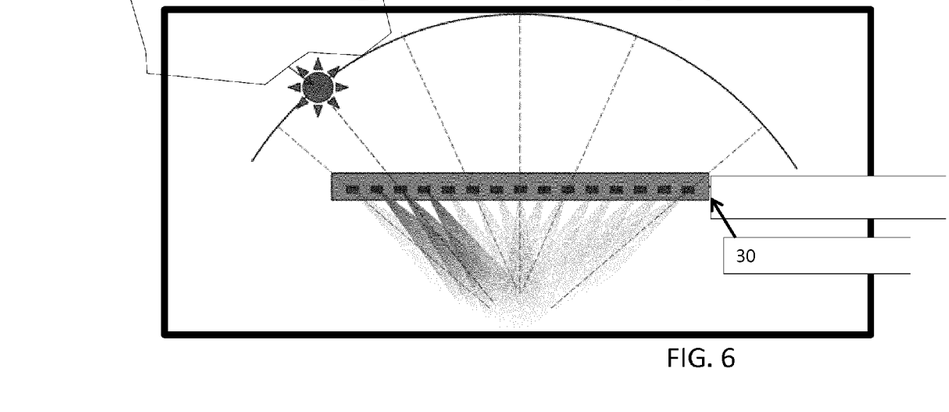
FIG. 6 shows how the control of FIG. 5 simulates daylight.

FIG. 6 shows how the arrangement of FIG. 5 simulates the position of the perceived sun.

The intensity of the dimmed LEDs should preferably not be zero, so as not to make the remaining area of the luminaire (which represents the simulated sky) completely dark.

The array of LEDs can be arranged as a rectangular or hexagonal grid of individual LEDs or LED clusters. Each LED or LED cluster is individually controlled to provide a desired intensity.

There are various ways to implement the optical arrangement for a flat luminaire.

Figure 7:
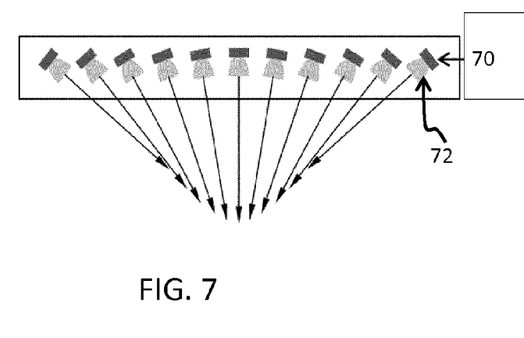
FIGS. 7 to 11 show five different implementations in more detail of the system of FIG. 4.

FIG. 7 shows a first example, in which each LED 70 has a collimating optical arrangement 72, such as a polycarbonate total internal reflecting collimator, creating a narrow beam shape with typically a FWHM between 5 and 35 degrees. Each LED 70 and collimator 72 is then mounted at an angle so it directs the light in the desired direction.

Figure 8:
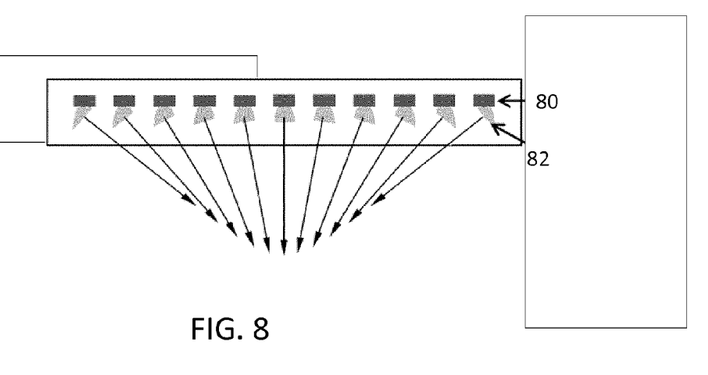

FIG. 8 shows a second example, in which the LEDs 80 are mounted flat, and each LED has a different optical arrangement 82, which collimates and directs the light of each LED in the desired direction.

Figure 9:
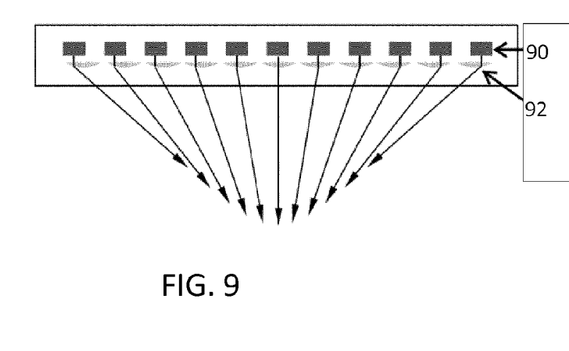

FIG. 9 shows a third example, in which each LED 90 has an identical optical arrangement 92 moved with respect to the center of the LED. The optical arrangement can for example be a refractive lens. The lens collimates the light of the LED and by shifting the lens with respect to the center of the LED, the light beam can be directed in the desired direction.

Figure 10:
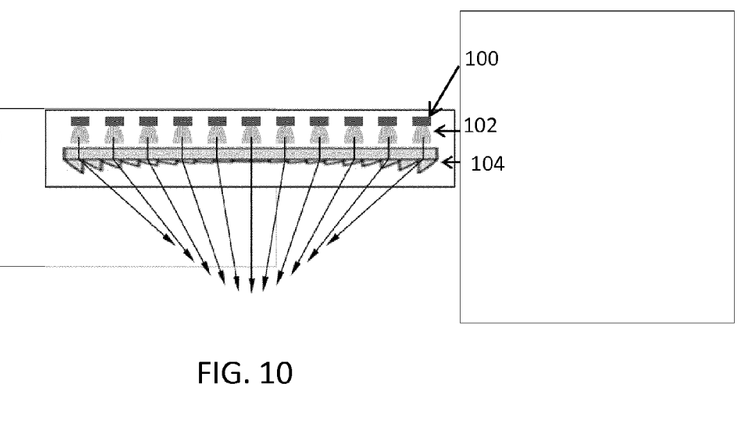

FIG. 10 shows a fourth example, in which each LED 100 is again placed on a flat surface and the light of each LED is provided with a collimator 102. The collimated light beams are then redirected to the desired direction by a secondary optical arrangement 104 which can be for example a single large Fresnel lens.

As mentioned above, all examples can make use of a diffuser at the exit window to mask the individual LEDs. The strength of the diffuser (typically defined as the FWHM angle of the diffusion profile) depends on the pitch of the LEDs and their distance to the exit window.

By way of example, the FWHM angle α in one example can be given approximately by:

$$\alpha = 2 \tan^{-1}(p/2d),$$

where p is the LED pitch and d is the distance between the LED plane and the exit window. The value of α is typically kept below or equal to 35 degrees to maintain a desired level of directionality. The actual value chosen will depend on the amount of masking of the light sources that is desired.

The use of LEDs with different color temperature can be applied to all examples. For example, warm white LEDs can be used in combination with collimator optics to create the directional sunlight, while LEDs with a higher color temperature (e.g. neutral or cold white) can be used without collimator optics to create a diffuse light component (e.g. an overcast sky).

Figure 11:
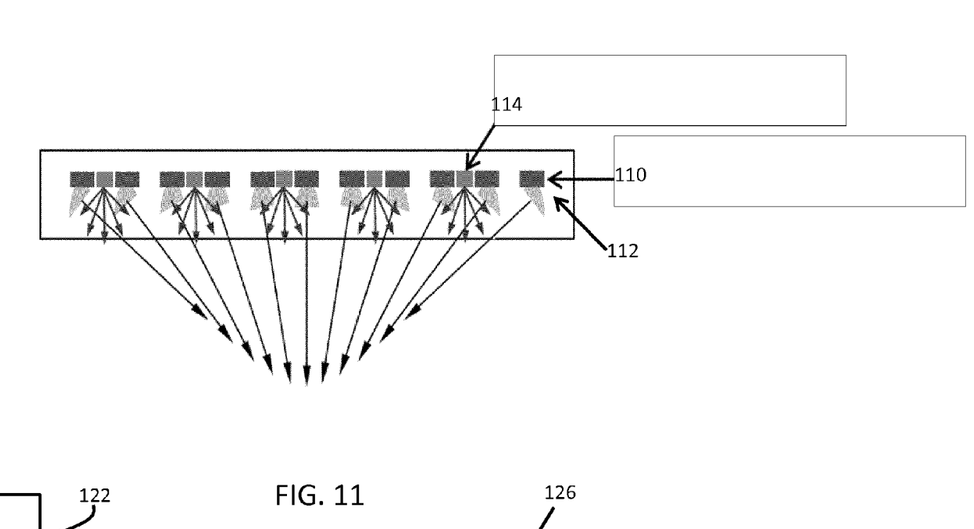

FIG. 11 shows an example of this approach. In this case LEDs 110 with collimation optics 112 provide the directional 'sunlight', while the LEDs 114 without optics (or optics that create a wide beam) can be used to change the brightness of the entire luminaire as seen under all angles.

The skylight appearance can be greatly enhanced if the LEDs with the wide emission pattern emit colored light. Using blue LEDs (which would typically be set to emit less light than the white LEDs) the overall appearance, in particular color, of the entire luminaire can be made to appear as a blue sky. Using RGB LEDs it would then also be possible to simulate sunset/sunrise colored skies.

It has been explained above how the lighting arrangement can replicate the movement of the sun during the course of the day. The system can also replicate the passing of clouds, or other time-varying weather conditions. The intensity level of the directional lighting can be controlled simultaneously with the intensity level of the diffuse lighting to achieve this effect. If all light sources are directional, this can be achieved by changing the overall background level of intensity compared to the intensity of the light source representing light emitting or light reflecting body. If some light sources are directional and others are diffuse light sources, the balance between the two can simulate a cloud passing in front of the sun. Color control can give a further improved replication of the sky conditions.

The embodiments described above provide dynamic solutions that vary the perceived direction of the light output, or else create the perception that the light comes from all angles, or mimic light from different sky conditions (i.e. cloudy day versus clear sky), adapt intensity and color temperature of the light output, and adapt the appearance of the luminaire to mimic different sky conditions. For all these desired effects, also static solutions can be realized, with no dynamic change over time. For example, a luminaire that always gives an 'afternoon clear sky' impression or a luminaire that gives the impression that light comes from all angles.

The invention is of particular interest for professional and consumer lighting systems.

Figure 12:
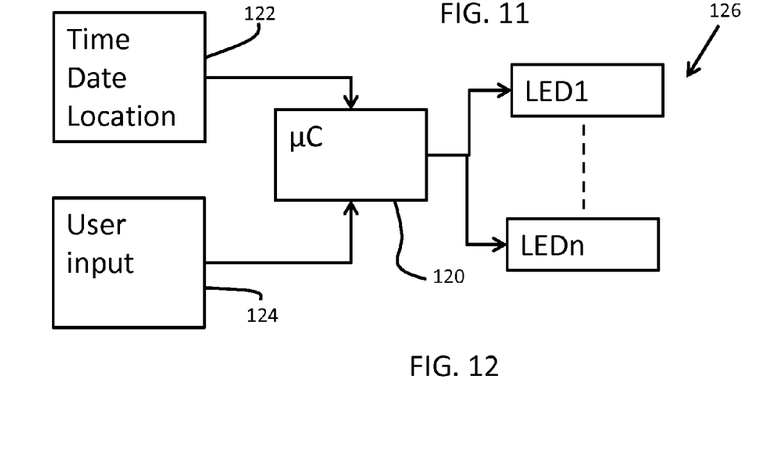
FIG. 12 shows a lighting system of the invention.

FIG. 12 shows a lighting system of the invention.

The system has a controller 120. In some examples it receives input 122 in the form of the time of day, the time within the year (date) and the location, so that the path of the sun can be determined. In other examples, the required input for providing a position of a light emitting or light reflecting body to represent the virtual sun position can be input 124 by a user. The controller 120 controls the individual LEDs or LED clusters, together shown as 126 in FIG. 12.

The controller can be implemented in numerous ways, with software and/or hardware, to perform the various functions required. A processor is one example of a controller which employs one or more microprocessors that may be programmed using software (e.g., microcode) to perform the required functions. A controller may however be implemented with or without employing a processor, and also may be implemented as a combination of dedicated hardware to perform some functions and a processor (e.g., one or more programmed microprocessors and associated circuitry) to perform other functions.

Examples of controller components that may be employed in various embodiments of the present disclosure include, but are not limited to, conventional microprocessors, application specific integrated circuits (ASICs), and field-programmable gate arrays (FPGAs).

In various implementations, a processor or controller may be associated with one or more storage media such as volatile and non-volatile computer memory such as RAM, PROM, EPROM, and EEPROM. The storage media may be encoded with one or more programs that, when executed on one or more processors and/or controllers, perform at the required functions. Various storage media may be fixed within a processor or controller or may be transportable, such that the one or more programs stored thereon can be loaded into a processor or controller.

The controller is able to implement various functions. One implementation of the invention can simply use a set of identical color LED clusters, so that the invention resides in the control of those clusters. The ones currently used to simulate sun will be controlled to be brighter and with a different color temperature to those currently used to simulate the sky. The color temperature of the clusters used to simulate the sun can also evolve during the day to replicate the rising and setting sun. Other implementations can make use of different types of LED cluster, for example with a different color point for directly overhead lighting to the color point for angled lighting. In this case, part of the variation is derived from the different types of LED rather than solely derived from the control. Again, further embodiments can make use of different types of LED or LED cluster for the lighting component representing direct sunlight and the lighting component representing general sky illumination. Thus, the invention can be implemented with different division between hardware and software.

As explained above, the system can simulate the position of the sun using a position of a light emitting or light reflecting body. However, position of the light emitting or light reflecting body does not have to match the sun position. It can rise and fall in the same way as the sun, without being based on the actual sun position—for example, the indoor system can simulate the progression over time of the sun position corresponding to a different time of year (such as summer) to the actual time of year (such as winter).

The simulated light source position can indeed carry out any time varying function, not only ones that replicate sun movement. For example, the position of the light emitting or light reflecting body can rise to a noon position, then stop for several hours, before setting again. The movement can be slower than the actual sun movement. It can also carry out a completely different time-dependent function if desired. For example, a static position of the light emitting or light reflecting body may be desired at the beginning of the day with position movement only at the end of the day, or vice versa. Finally, the system can implement control which is completely different, to create other effects, for example circling the bright intensity direction around a room. The time-varying parameter can implement any of these options.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage. Any reference signs in the claims should not be construed as limiting the scope.

The invention claimed is:

1. A lighting system comprising:
 a lighting unit having an array of lighting elements arranged to emit light through a light exit aperture of the lighting unit, wherein different lighting elements are arranged to provide light in different directions through the light exit aperture; and
 a controller,
 wherein the controller is adapted to control the lighting elements in dependence on a time-varying parameter related to at least one of a position of an orbital body, and an intensity, color or color temperature of the light emitted or reflected by the orbital body, such that a first lighting element which provides light in a direction corresponding to the position of the orbital body is brighter than a second lighting element providing light in a direction offset from the direction corresponding to the position of the orbital body.

2. A lighting system as claimed in claim 1, further comprising:
 a second array of lighting elements each arranged to emit light in the same range of output directions through the light exit aperture.

3. A lighting system as claimed in claim 2, wherein the lighting elements of the second array have a color point with a greater blue component than the color point of the lighting elements of the first array.

4. A system as claimed in claim 1, wherein the first lighting element has a light emission spectrum which is different to the light emission spectrum of the second lighting element.

5. A system as claimed in claim 1, wherein the time-varying parameter takes into account the time of day, and optionally also:
 the time within the year and/or
 the geographical location of the system and/or
 the weather conditions at the location of the system.

6. A system as claimed in claim 1, wherein different lighting elements have light outputs with different color points, such that lighting elements having a directly downward light output direction through the exit aperture have a higher color temperature than lighting elements with a light output direction offset from the downward direction.

7. A system as claimed in claim 1, wherein the array of lighting elements comprise a matrix of lighting elements provided on a convex curved support facing the light output aperture.

8. A system as claimed in claim 1, wherein the array of lighting elements comprise a matrix of lighting elements provided on a planar support, wherein each lighting element comprises a light source and an arrangement for setting the light output direction.

9. A system as claimed in claim 8, wherein the arrangement comprises:
 a support surface for each lighting element, with different support surfaces tilted at different angles, and a light collimator associated with each lighting element; or
 a beam shaping optical arrangement associated with each lighting element with different beam shaping elements providing different directional output; or
 a beam shaping optical arrangement associated with each lighting element with different relative positions of identical beam shaping elements with respect to their associated lighting elements providing different directional output; or
 a collimator associated with each lighting element and a shared Fresnel lens providing different directional output.

10. A lighting system as claimed in claim 2, wherein the lighting elements of the second array have a controllable color point.

11. A method of controlling a lighting system, comprising:
 detecting a time-varying parameter or receiving an input of a time varying parameter;
 deriving a position of an orbital body from the time-varying parameter; and
 controlling a lighting unit to emit light through a light exit aperture of the lighting unit, with different lighting elements providing light in different directions through the light exit aperture,
 wherein the method further comprises controlling the intensity of the lighting elements in dependence on the position of the orbital body, such that a first lighting element which provides light in a direction corresponding to the direction from the position of the orbital body is brighter than a second lighting element providing light in a direction offset from the direction corresponding to the direction from the position of the orbital body.

12. A method as claimed in claim 11, comprising:
controlling the first lighting unit to have the brightest intensity and controlling other lighting units with reduced intensity in dependence on their distance from the first lighting unit.

13. A method as claimed in claim 11, wherein the time-varying parameter takes into account the time of day, and optionally also the time within the year and/or the geographical location of the system.

* * * * *